US011757855B2

(12) United States Patent
Gwak et al.

(10) Patent No.: US 11,757,855 B2
(45) Date of Patent: Sep. 12, 2023

(54) METHOD AND APPARATUS FOR COMMUNICATIONS USING SECRET KEY IN COMMUNICATION SYSTEM

(71) Applicant: ELECTRONICS AND TELECOMMUNICATIONS RESEARCH INSTITUTE, Daejeon (KR)

(72) Inventors: Dong Hyuk Gwak, Daejeon (KR); Hyung Sik Ju, Hwaseong-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 502 days.

(21) Appl. No.: 16/860,796

(22) Filed: Apr. 28, 2020

(65) Prior Publication Data

US 2020/0351255 A1    Nov. 5, 2020

(30) Foreign Application Priority Data

May 2, 2019    (KR) .......................... 10-2019-0051496
Dec. 3, 2019    (KR) .......................... 10-2019-0159253

(51) Int. Cl.
  *H04L 9/40*    (2022.01)
  *H04L 5/00*    (2006.01)
  *H04L 47/32*    (2022.01)
(52) U.S. Cl.
  CPC .......... *H04L 63/061* (2013.01); *H04L 5/0048* (2013.01); *H04L 47/323* (2013.01); *H04L 63/0442* (2013.01)

(58) Field of Classification Search
  None
  See application file for complete search history.

(56) References Cited

U.S. PATENT DOCUMENTS

| 9,042,544 | B2 | 5/2015 | Baek et al. |
| 9,185,599 | B2 | 11/2015 | Nam |
| 9,843,440 | B2 | 12/2017 | Choi et al. |
| 10,531,291 | B2 | 1/2020 | Bae et al. |
| 2004/0148509 | A1* | 7/2004 | Wu .................. H04L 9/0866 713/186 |

(Continued)

FOREIGN PATENT DOCUMENTS

| KR | 101019202 B1 | 3/2011 |
| KR | 1020140062400 A | 5/2014 |

(Continued)

*Primary Examiner* — Mariela Vidal Carpio
(74) *Attorney, Agent, or Firm* — Rabin & Berdo, P.C.

(57) ABSTRACT

An operation method of a first communication node in a communication system may comprise estimating a channel state between the first communication node and a second communication node based on a pilot signal received from the second communication node; generating a first channel codebook based on the estimated channel state; transmitting information of the first channel codebook to the second communication node; receiving a response indicating whether the first channel codebook is to be used from the second communication node; when the response is an ACK indicating that the first channel codebook is to be used, generating a first secret key by using the first channel codebook; and transmitting data encrypted using the first secret key to the second communication node.

13 Claims, 7 Drawing Sheets

(56) References Cited

U.S. PATENT DOCUMENTS

| | | | |
|---|---|---|---|
| 2009/0022049 A1* | 1/2009 | Zeng | H04L 9/0838 |
| | | | 380/278 |
| 2011/0075752 A1 | 3/2011 | Zheng et al. | |
| 2011/0081901 A1* | 4/2011 | Moulsley | H04B 7/0486 |
| | | | 455/422.1 |
| 2011/0310994 A1* | 12/2011 | Ko | H04B 7/0639 |
| | | | 375/295 |
| 2014/0133382 A1 | 5/2014 | Shin et al. | |
| 2015/0023503 A1 | 1/2015 | Baek et al. | |
| 2015/0049713 A1* | 2/2015 | Lan | H04L 9/0844 |
| | | | 370/329 |
| 2015/0188682 A1* | 7/2015 | Noh | H04B 7/0686 |
| | | | 370/329 |
| 2018/0139758 A1* | 5/2018 | Sankar | H04W 72/0466 |
| 2019/0280858 A1* | 9/2019 | Cam | H04L 9/0866 |
| 2019/0363843 A1* | 11/2019 | Gordaychik | H04W 52/58 |
| 2022/0224391 A1* | 7/2022 | Ramireddy | H04B 7/0639 |
| 2022/0311492 A1* | 9/2022 | Wu | H04L 5/0051 |

FOREIGN PATENT DOCUMENTS

| | | |
|---|---|---|
| KR | 101419617 B1 | 7/2014 |
| KR | 101446629 B1 | 10/2014 |
| KR | 1020160046368 A | 4/2016 |
| WO | 2006/081306 A2 | 8/2006 |

* cited by examiner

METHOD AND APPARATUS FOR COMMUNICATIONS USING SECRET KEY IN COMMUNICATION SYSTEM

CROSS-REFERENCE TO RELATED APPLICATIONS

This application claims priority to Korean Patent Applications No. 10-2019-0051496 filed on May 2, 2019 and No. 10-2019-0159253 filed on Dec. 3, 2019 with the Korean Intellectual Property Office (KIPO), the entire contents of which are hereby incorporated by reference.

BACKGROUND

1. Technical Field

The present disclosure relates to a technique for communications using a secret key, and more specifically, to a technique for communications using a secret key generated based on channel state information in a communication system supporting multiple carriers.

2. Related Art

The communication system (hereinafter, a new radio (NR) communication system) using a higher frequency band (e.g., a frequency band of 6 GHz or higher) than a frequency band (e.g., a frequency band lower below 6 GHz) of the long term evolution (LTE) (or, LTE-A) is being considered for processing of soaring wireless data. The NR communication system may support not only a frequency band below 6 GHz but also 6 GHz or higher frequency band, and may support various communication services and scenarios as compared to the LTE communication system. For example, usage scenarios of the NR communication system may include enhanced mobile broadband (eMBB), ultra-reliable low-latency communication (URLLC), massive machine type communication (mMTC), and the like.

In a communication system (e.g., LTE communication system or NR communication system), since signals are radiated into the air, there may always be a risk of eavesdropping. Methods for preventing eavesdropping may be largely classified into a method using a secret key (e.g., security key) and a method not using a secret key. The method not using a secret key may be a security method at a physical layer. In the method not using a secret key, since characteristics of a channel between a transmitter and a receiver are better than characteristics of a channel between the transmitter and an eavesdropper, secure information may be transmitted based on the characteristics of the channels.

The method using a secret key may be a method of encoding and decoding data using a previously distributed secret key. For completely-secure communications, a secret key having a length equal to the length of data to be transmitted may be required. In addition, it is essential to periodically provide a secret key for continuous complete secure communications. However, the implementation difficulty of periodically providing a secret key is unrealistically high. Therefore, in a real communication system, secure communication is performed in a way that bypasses the operation of periodically providing a secret key.

Implementation of the operation of periodically providing a secret key may have difficulties in two aspects. When a secret key is provided to the transmitter and the receiver, there is a problem in that an infinitely long secret key should be provided. In order to solve this problem, a predefined irrational number may be used as the secret key. In addition, when a secret key is continuously provided through a wireless channel, security may be deteriorated by stealing or leakage of the secret key by eavesdropping. In order to solve this problem, a secret key may be provided by a quantum communication scheme.

However, the method using a predefined irrational number may not be continuously used because the computational amount is gradually increased. Also, since the quantum communication is still in a laboratory stage, the implementation difficulty thereof may be very high. Due to these technical limitations, in a real communication system, a method of generating a secret key using a random number table having a limited length, a method of generating a new secret key using a pseudo random sequence such as one time password (OTP), a method of generating a secret key by combining a previously provided secret key with a public key provided through non-secure communication, such as Rivest-Shamir-Adleman (RSA), or the like may be used. Such the incomplete security of the secure communications may be deteriorated by a brute force attack. Therefore, there is a need for a new secure communication method to compensate for the implementation complexity of complete secure communications and the security vulnerability of incomplete secure communications.

SUMMARY

Accordingly, exemplary embodiments of the present disclosure provide a method and an apparatus for communications using a secret key generated based on channel state information in a communication system supporting multiple carriers.

According to a first exemplary embodiment of the present disclosure, an operation method of a first communication node in a communication system may comprise estimating a channel state between the first communication node and a second communication node based on a pilot signal received from the second communication node; generating a first channel codebook based on the estimated channel state; transmitting information of the first channel codebook to the second communication node; receiving a response indicating whether the first channel codebook is to be used from the second communication node; when the response is an acknowledgment (ACK) indicating that the first channel codebook is to be used, generating a first secret key by using the first channel codebook; and transmitting data encrypted using the first secret key to the second communication node.

The first channel codebook may be selected within a set of channel codebooks predefined between the first communication node and the second communication node, and the first channel codebook may be a vector quantization set for the estimated channel state.

The first channel codebook may be generated when the estimated channel state is different from a previously estimated channel state.

Information of the estimated channel state may include channel variance information and a signal to interference plus noise ratio (SINR).

When a size of the first channel codebook is equal to or less than a size of a second channel codebook generated by the second communication node, the ACK may be received from the second communication node, and the second channel codebook may be generated based on a pilot signal transmitted from the first communication node.

The operation method may further comprise receiving data from the second communication node; and performing a decryption operation on the data by using the first secret key.

The operation method may further comprise, when the response is a negative ACK (NACK) indicating that the first channel codebook is not to be used, receiving information of a second channel codebook from the second communication node; generating a second secret key by using the second channel codebook; and transmitting data encrypted using the second secret key to the second communication node, wherein the second channel codebook is generated based on a pilot signal transmitted from the first communication node.

When a size of the first channel codebook exceeds a size of the second channel codebook, the NACK may be received from the second communication node.

According to a second exemplary embodiment of the present disclosure, an operation method of a first communication node in a communication system may comprise transmitting a first pilot signal to a second communication node; estimating a channel state between the first communication node and the second communication node based on a second pilot signal received from the second communication node; generating a first channel codebook based on the estimated channel state; receiving information of a second channel codebook generated based on a channel state estimated based on the first pilot signal from the second communication node; when a size of the second channel codebook is equal to or less than a size of the first channel codebook, adjusting the size of the first channel codebook to be equal to the size of the second channel codebook; and transmitting an acknowledgment (ACK) indicating that the second channel codebook is to be used to the second communication node.

The operation method may further comprise generating a first secret key by using the size-adjusted first channel codebook; and transmitting data encrypted using the first secret key to the second communication node.

The operation method may further comprise, when the size of the second channel codebook exceeds the size of the first channel codebook, transmitting a negative ACK (NACK) indicating that the second channel codebook is not to be used to the second communication node; and transmitting information of the first channel codebook to the second communication node.

Each of the first channel codebook and the second channel codebook may be selected within a set of channel codebooks predefined between the first communication node and the second communication node, the first channel codebook may be a vector quantization set for the channel state estimated based on the second pilot signal, and the second channel codebook may be a vector quantization set for the channel state estimated based on the first pilot signal.

The first channel codebook may be generated when the channel state estimated based on the second pilot signal is different from a previously estimated channel state.

According to a third exemplary embodiment of the present disclosure, a first communication node in a communication system may comprise a channel estimator estimating a channel state between the first communication node and a second communication node based on a pilot signal received from the second communication node; a channel codebook generator generating a first channel codebook based on the estimated channel state; a secret key codebook generator generating a secret key based on the first channel codebook; an encryptor performing an encryption operation on transmission data by using the secret key; and a decryptor performing a decryption operation on reception data by using the secret key.

Information of the estimated channel state may include channel variance information and a signal to interference plus noise ratio (SINR).

The first channel codebook may be selected within a set of channel codebooks predefined between the first communication node and the second communication node, and the first channel codebook may be a vector quantization set for the estimated channel state.

The first channel codebook may be generated when the estimated channel state is different from a previously estimated channel state.

When a size of the first channel codebook is equal to or less than a size of a second channel codebook generated by the second communication node, the secret key may be generated by using the first channel codebook, and the second channel codebook may be generated based on a pilot signal transmitted from the first communication node.

When a size of the first channel codebook exceeds a size of a second channel codebook generated by the second communication node, the secret key may be generated by using the first channel codebook the size of which is adjusted to be equal to the size of the second channel codebook, and the second channel codebook may be generated based on a pilot signal transmitted from the first communication node.

When the first communication node supports a full duplex communication, the secret key used for the encryption operation may be used in the decryptor after a preconfigured time.

According to the exemplary embodiments of the present disclosure, each communication node performing communication can generate a secret key based on a synchronized channel codebook. Therefore, since a procedure of exchanging the secret key between the communication nodes does not need to be performed, the communication procedure can be simplified and the security can be improved. The procedure for exchanging a secret key may be performed usually through another medium instead of a wireless channel, but even another medium may not be used in the exemplary embodiments of the present disclosure.

Further, a secret key can be provided in a fully secured form according to the exemplary embodiments of the present disclosure. For example, when there is spatial disassociation of a channel between the transmitter and the receiver and a channel between the transmitter and the eavesdropper, the secret key can be shared in a fully secured form. Also, the secret key can be continuously provided according to the exemplary embodiments of the present disclosure. For example, when a channel state changes with time, the secret key according to the changed channel state can be continuously generated. Therefore, the security and performance of the communication system can be improved.

BRIEF DESCRIPTION OF DRAWINGS

Exemplary embodiments of the present disclosure will become more apparent by describing in detail embodiments of the present disclosure with reference to the accompanying drawings, in which.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may be used in the same sense as a communication network.

Figure 1:
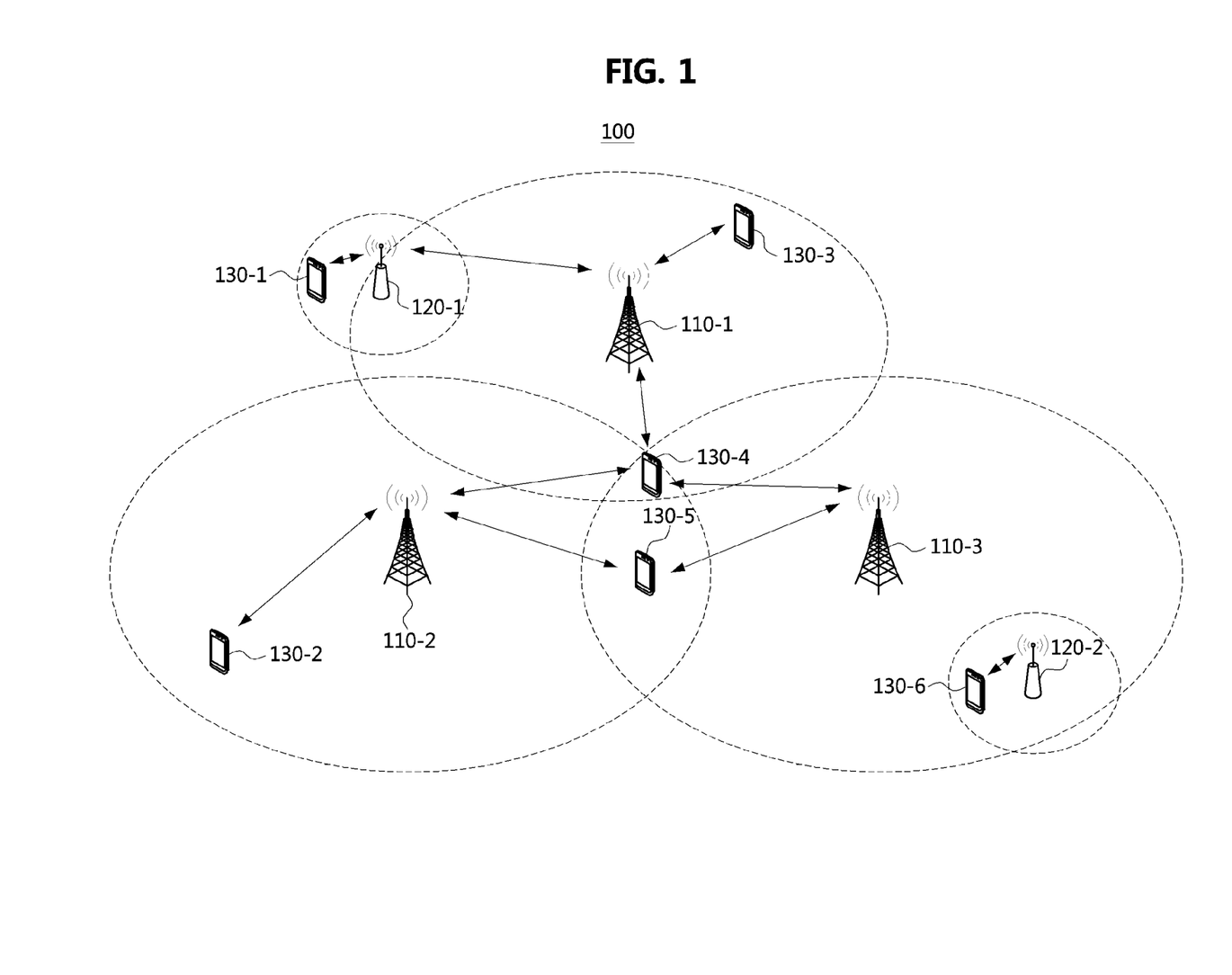
FIG. 1 is a conceptual diagram illustrating a first exemplary embodiment of a communication system.

FIG. 1 is a conceptual diagram illustrating a first exemplary embodiment of a communication system.

Referring to FIG. 1, a communication system 100 may comprise a plurality of communication nodes 1101, 110-2, 110-3, 120-1, 120-2, 130-1, 130-2, 130-3, 130-4, 130-5, and 130-6. The plurality of communication nodes may support 4G communication (e.g., long term evolution (LTE) and LTE-Advance (LTE-A)), 5G communication, or the like specified by the $3^{rd}$ generation partnership project (3GPP) standards. The 4G communication may be performed in a frequency band of 6 GHz or below, and the 5G communication may be performed in a frequency band of 6 GHz or above as well as the frequency band of 6 GHz or below.

For example, for the 4G and 5G communications, the plurality of communication nodes may support code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform-spread-OFDM (DFT-s-OFDM) based communication protocol, orthogonal frequency division multiple access (OFDMA) based communication protocol, single carrier FDMA (SC-FDMA) based communication protocol, non-orthogonal multiple access (NOMA) based communication protocol, generalized frequency division multiplexing (GFDM) based communication protocol, filter band multi-carrier (FBMC) based communication protocol, universal filtered multi-carrier (UFMC) based communication protocol, space division multiple access (SDMA) based communication protocol, and the like.

In addition, the communication system 100 may further include a core network. When the communication system 100 supports the 4G communication, the core network may include a serving-gateway (S-GW), a packet data network (PDN) gateway (P-GW), a mobility management entity (MME), and the like. When the communication system 100 supports the 5G communication, the core network may include a user plane function (UPF), a session management function (SMF), an access and mobility management function (AMF), and the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
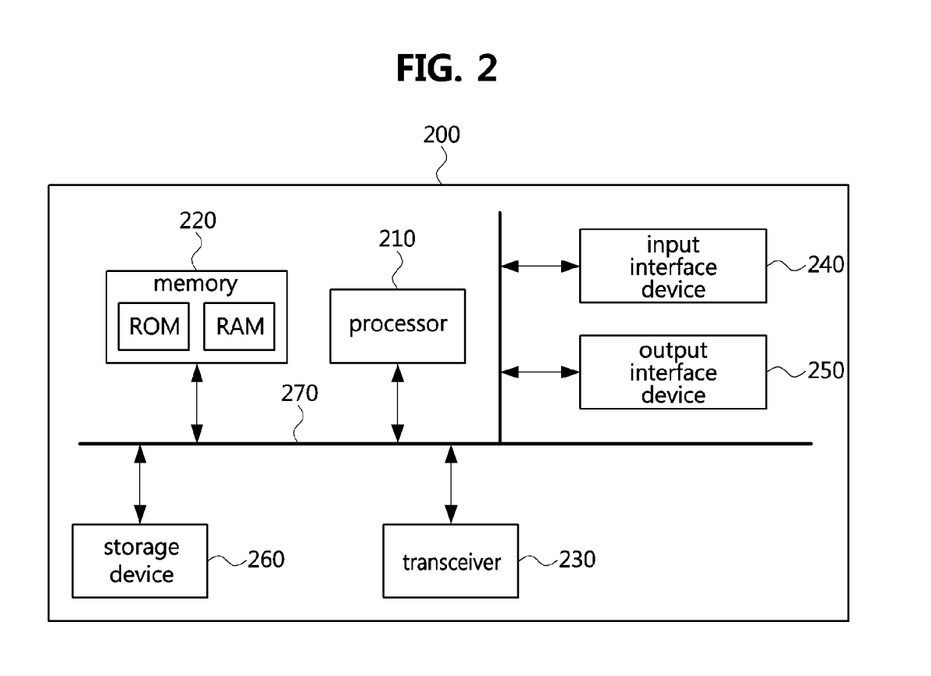
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, the respective components included in the communication node 200 may be connected through a separate interface or a separate bus around the processor 210 instead of the common bus 270. For example, the processor 210 may be connected to at least one of the memory 220, the transceiver 230, the input interface device 240, the output interface device 250, and the storage device 260 through a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring back to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to the cell coverage of the first base station 110-1. Also, the second terminal 130-2, the fourth terminal 130-4, and the fifth terminal 130-5 may belong to the cell coverage of the second base station 110-2. Also, the fifth base station 120-2, the fourth terminal 130-4, the fifth terminal 130-5, and the sixth terminal 130-6 may belong to the cell coverage of the third base station 110-3.

Also, the first terminal 130-1 may belong to the cell coverage of the fourth base station 120-1, and the sixth terminal 130-6 may belong to the cell coverage of the fifth base station 120-2.

Here, each of the plurality of base stations 110-1, 110-2, 110-3, 120-1, and 120-2 may be referred to as NodeB (NB), evolved NodeB (eNB), gNB, ng-eNB, base transceiver station (BTS), radio base station, radio transceiver, access point (AP), access node, road side unit (RSU), radio remote head (RRH), transmission point (TP), transmission and reception point (TRP), flexible-TRP (F-TRP), or the like. Each of the plurality of terminals 130-1, 130-2, 130-3, 130-4, 130-5, and 130-6 may be referred to as user equipment (UE), terminal, access terminal, mobile terminal, station, subscriber station, mobile station, portable subscriber station, node, device, apparatus supporting Internet of things (IoT) functions, mounted module/device/terminal, on board unit (OBU), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or non-ideal backhaul. Also, each of the plurality of base stations 110-1, 110-2, 110-3, 120-1, and 120-2 may be connected to the core network through the ideal backhaul link or non-ideal backhaul link. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Also, each of the plurality of base stations 110-1, 110-2, 110-3, 120-1, and 120-2 may support a multi-input multi-output (MIMO) transmission (e.g., single-user MIMO (SU-MIMO), multi-user MIMO (MU-MIMO), massive MIMO, or the like), a coordinated multipoint (CoMP) transmission, a carrier aggregation (CA) transmission, a transmission in unlicensed band, a device-to-device (D2D) communication (or, proximity services (ProSe)), an Internet of Things (IoT) communication, a dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

Each of the first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, communication methods using a secret key (e.g., security key) in a communication system will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a terminal is described, a corresponding base station may perform an operation corresponding to the operation of the terminal. Conversely, when an operation of the base station is described, the corresponding terminal may perform an operation corresponding to the operation of the base station.

The following exemplary embodiments may be applied to the LTE communication system, the NR communication system, a wireless local area network (WLAN) communication system, or the like. In the communication systems (e.g., LTE communication system, NR communication system, WLAN communication system, etc.), communication nodes (e.g., base station or terminals) may perform communications using a secret key. The secret key may be generated based on channel state information between the communication nodes. For example, when the following three conditions are satisfied, a completely-secured secret key may be continuously provided to a transmitter and a receiver. In the exemplary embodiments below, the secret key may mean a security key.

Condition 1: Change of channel state with time
Condition 2: Symmetry of the channel
Condition 3: Spatial disassociation of the channel between the transmitter and the receiver and the channel between the transmitter and the eavesdropper Each of the transmitter and the receiver may generate a secret key based on the channel state between the transmitter and the receiver, and may perform communications using the generated secret key. In downlink communication, the transmitter may be a base station, and the receiver may be a terminal. In uplink communication, the transmitter may be a terminal, and the receiver may be a base station. In sidelink communication, the transmitter may be a first terminal, and the receiver may be a second terminal. Each of the transmitter and the receiver may be configured as follows.

Figure 3:
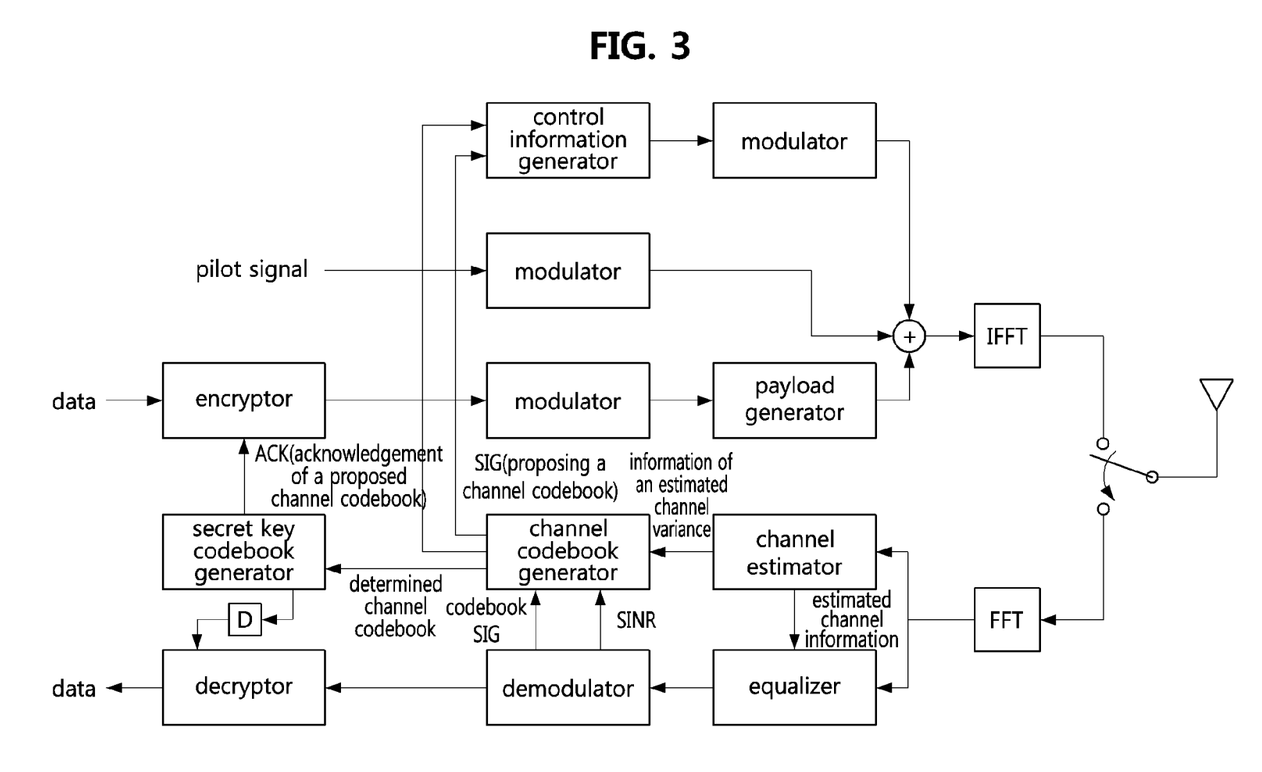
FIG. 3 is a block diagram illustrating a second exemplary embodiment of a communication node constituting a communication system.

FIG. 3 is a block diagram illustrating a second exemplary embodiment of a communication node constituting a communication system.

Referring to FIG. 3, a communication node (e.g., transmitter and receiver) may include an encryptor, a modulator, a control information generator, a payload generator, a fast Fourier transform (FFT), an inverse FFT (IFFT), a channel estimator, an equalizer, a demodulator, a decryptor, a channel codebook generator, and a secret key codebook generator. The operations of the encryptor, modulator, control information generator, payload generator, FFT, IFFT, channel estimator, equalizer, demodulator, decryptor, channel codebook generator, and secret key codebook generator may be performed by the processor 210 shown in FIG. 2.

The communication node may perform communication in a time division multiplexing (TDM) scheme or a full duplex scheme. When the communication node supports the full-duplex scheme, the communication node may include a transmission antenna(s) connected to units processing transmission signals and a reception antenna(s) connected to units processing reception signals.

The communication node may further include the channel codebook generator and the secret key codebook generator compared to the conventional communication node. The channel codebook generator may determine a channel codebook (e.g., a length of the channel codebook) based on information on an estimated channel variance obtained from the channel estimator, signal to interference plus noise ratio (SINR) obtained from the demodulator, and the like. The channel codebook determined by the channel codebook generator may be delivered to the secret key codebook generator.

Further, information of the channel codebook determined by the channel codebook generator may be transmitted to a counterpart communication node. For example, a signal (SIG) field including the information of the channel codebook may be transmitted to the counterpart communication node. Alternatively, a SIG field including information of a channel codebook determined by the counterpart communication node may be received from the counterpart communication node. When the channel codebook received from the counterpart communication node can be used, an acknowledgment (ACK) indicating that the channel codebook proposed by the counterpart communication node is accepted may be transmitted to the counterpart communication node.

The secret key codebook generator may generate a secret key codebook based on the channel codebook obtained from the channel codebook generator. The secret key codebook may be a subset of the channel codebook. The secret key codebook generator may select a secret key within the secret key codebook, and the selected secret key may be delivered to the encryptor and the decryptor. The encryptor may perform an encryption operation on data using the secret key obtained from the secret key codebook. The decryptor may obtain data by performing a decryption operation on a bit stream (e.g., a bit stream obtained from the demodulator) using the secret key obtained from the secret key codebook.

Detailed Operations of the Channel Codebook Generator

The communication node (e.g., transmitter and receiver) may have a set of predefined channel codebooks (e.g., channel codebooks used for generating a secret key). The set of predefined channel codebooks possessed by the transmitter may be the same as the set of predefined channel codebooks possessed by the receiver. The predefined channel codebooks may have different lengths. The channel codebook generator may select one or more channel codebooks from the predefined channel codebooks based on a state of a current target channel and a state of an interference channel.

The channel codebook may be a vector quantization set for expressing an analog value of the estimated channel state as a digital value. For example, when an index having a length of B-bits is used to express an N-dimensional vector, $2^B$ N-dimensional vectors may be elements of the channel codebook. An index of an N-dimensional vector most similar to the estimated channel may be selected among the $2^B$ N-dimensional vectors. Here, B may be a length of the index of the channel codebook.

When communication between a transmitter having N physical antennas and a receiver having N physical antennas is performed, a channel between the transmitter and the receiver may be assumed to be an N×N matrix each element of which is an independent and identically distributed (iid) Gaussian. The N×N matrix, vec(H), may be defined as in Equation 1 below.

$$\text{vec}(H) \sim CN(0, \rho I_{N^2}) \quad \text{[Equation 1]}$$

ρ may be an average channel magnitude. CN may mean a complex Gaussian distribution. $I_{N^2}$ may be an identity matrix having a size of $N^2 \times N^2$. Various vector quantization operations for the multi-dimensional Gaussian vector may be performed based on the conventional methods. When the dimensions are sufficiently large and the number of elements in the channel codebook is sufficiently large, Equation 2 below may be defined.

$$E[e_H^H e_H] = \rho/2^B \quad \text{[Equation 2]}$$

The quantization error vector $e_H$ of the estimated channel may be defined as in Equation 3 below.

$$e_H = \text{vec}(H) - \text{vec}(H^{CN}) \quad \text{[Equation 3]}$$

A channel estimation error may be mainly caused by two factors. The first factor may be an estimation error due to contamination of a pilot signal in the channel estimation procedure. Here, the pilot signal may be a reference signal. The second factor may be a quantization error occurring in the quantization procedure of the estimated channel state information. In the quantization procedure of the estimated channel state information, if the size of the channel codebook is sufficiently large, the quantization error may be removed, but as the size of the channel codebook increases, the length of the index of the channel codebook may increase. In this case, overhead may be increased in a feedback procedure of the index of the channel codebook.

The channel codebook generator may determine the length B of the index of the channel codebook based on Equation 4 below. For example, the channel codebook generator may determine the largest value among values of B satisfying Equation 4 below as the length of the index of the channel codebook. The size of the channel codebook may be determined based on B determined according to Equation 4.

$$\frac{\rho/2^B}{I_{PC}+1} > \eta_{QE} \quad \text{[Equation 4]}$$

$I_{PC}$ may be a relative power against an ambient noise of interference due to the pilot contamination. $\eta_{QE}$ may be a coefficient for determining the size of the channel codebook. For example, $\eta_{QE}$ may be 6 dB.

On the other hand, when communication between the first communication node and the second communication node (e.g., TDM-based communication or full-duplex communication) is performed, since the communication nodes experience interferences due to different pilot contaminations, a channel codebook generated by the first communication node (hereinafter referred to as 'first channel codebook') may be different from a channel codebook generated by the second communication node (hereinafter referred to as 'second channel codebook'). The first communication node may inform the second communication node of the first channel codebook, and the second communication node may inform the first communication node of the second channel codebook.

For example, the first communication node may obtain information of the second channel codebook from the second communication node. The first communication node may synchronize the size of the first channel codebook to the size of the second channel codebook when the size of the second channel codebook is less than or equal to the size of the first channel codebook. When the synchronization between the channel codebooks is completed, the first communication node may transmit an ACK indicating that the second channel codebook is used for communication between the first communication node and the second communication node to the second communication node. Thereafter, the channel codebook synchronized between the first communication node and the second communication node may be delivered to the secret key codebook generator of the first communication node. When the ACK is received from the first communication node, the second communication node may determine that the second channel codebook is used for communication between the first communication node and the second communication node. Therefore, the second channel codebook may be delivered to the secret key codebook generator of the second communication node.

On the other hand, when the size of the second channel codebook exceeds the size of the first channel codebook, the first communication node may transmit to the second communication node a negative ACK (NACK) indicating that the second channel codebook is not used for communication between the first communication node and the second communication node. In addition, the first communication node may inform the second communication node of the information of the first channel codebook. When the NACK is received from the first communication node, the second communication node may determine that the second channel codebook is not used for communication between the first communication node and the second communication node. Also, when the information of the first channel codebook is received from the first communication node, the second communication node may compare the size of the first channel codebook with the size of the second channel codebook.

The second communication node may synchronize the size of the second channel codebook to the size of the first channel codebook when the size of the first channel codebook is less than or equal to the size of the second channel codebook. When the synchronization between the channel codebooks is completed, the second communication node may transmit to the first communication node an ACK indicating that the first channel codebook is used for communication between the first communication node and the second communication node. Thereafter, the channel codebook synchronized between the first communication node and the second communication node may be delivered to the secret key codebook generator of the second communication node. When the ACK is received from the second communication node, the first communication node may determine that the first channel codebook is used for communication between the first communication node and the second communication node. Therefore, the first channel codebook may be delivered to the secret key codebook generator of the first communication node.

Detailed Operations of the Secret Key Codebook Generator

The secret key codebook may exist independently of the channel codebook. The secret key codebook may be a subset of the set of elements of the channel codebook. The length of the index of the secret key codebook may be D, and D may be less than or equal to B (i.e., the length of the index of the channel codebook). The communication node (e.g., transmitter and receiver) may have a set of predefined secret key codebooks. The set of predefined secret key codebooks the transmitter has may be the same as the set of predefined secret key codebooks that the receiver has. Each element of the secret key codebook may, on average, correspond to $2^{(B-D)}$ elements of the channel codebook.

The secret key codebook generator may determine the length D of the index of the secret key codebook based on Equation 5 below. For example, the secret key codebook generator may determine the largest value among D values satisfying Equation 5 below as the length of the index of the secret key codebook.

$$\frac{\rho/2^D}{I_{PC}+1} > \eta_{QE2} \quad \text{[Equation 5]}$$

$\eta_{QE^2}$ may be a coefficient for determining the size of the channel codebook. For example, $\eta_{QE^2}$ may be 15 dB. When the length D of the index of the secret key codebook is determined, an index having a length of min(B,D) bits may be used as the secret key for data transmission. For example, the secret key corresponding to the index having the length of min(B,D) bits may be used for the encryption operation of the data in the transmission procedure, and the secret key corresponding to the index having the length of min(B,D) bits may be used for the decryption operation of the data in the reception procedure. In a full-duplex based communication procedure, the secret key may be used for decryption of data received after a certain delay (e.g., a predefined time) or after counting a certain number of data units.

Hereinafter, a communication method using a secret key will be described.

Figure 4:
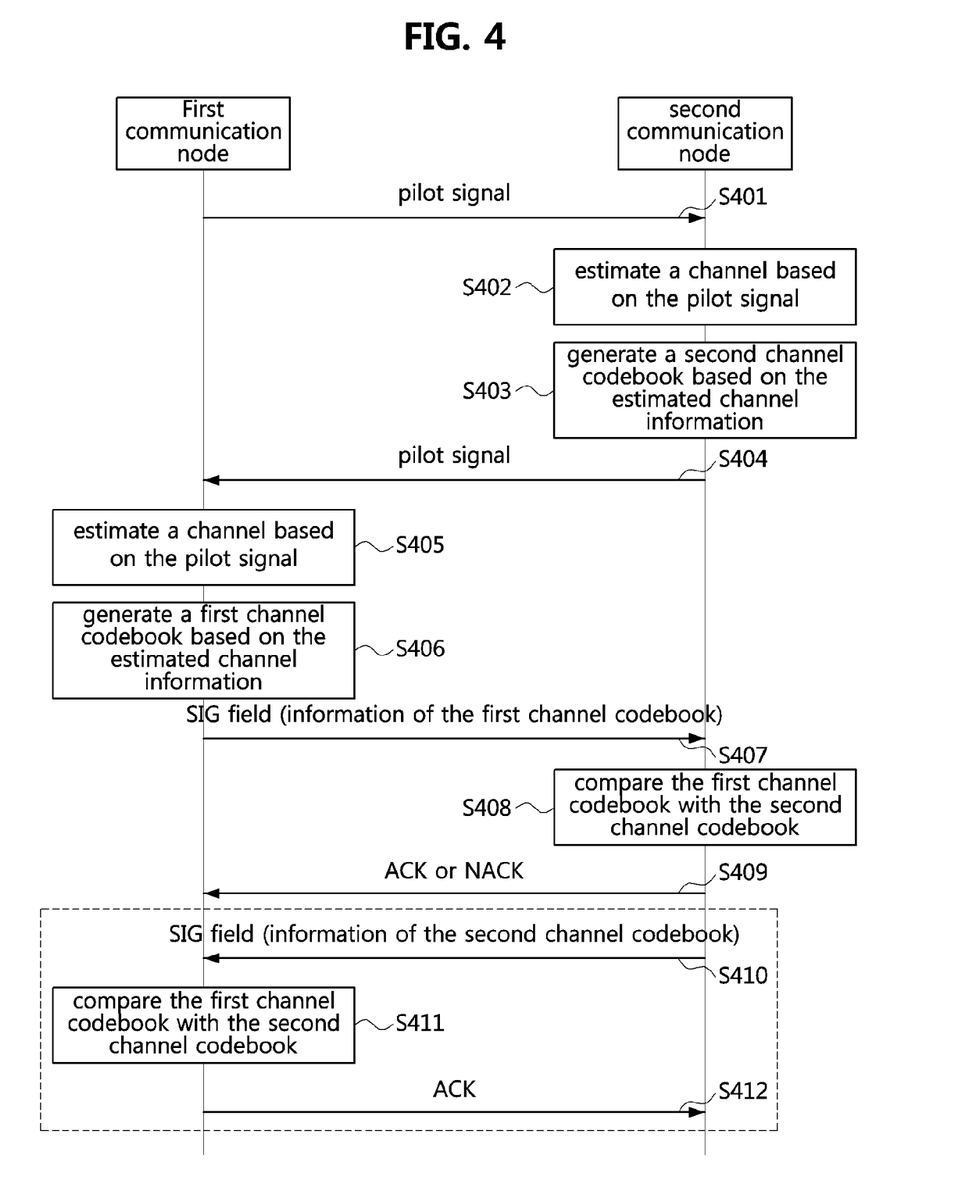
FIG. 4 is a sequence chart illustrating a first exemplary embodiment of a method for synchronizing channel codebooks in a communication system.
Figure 5:
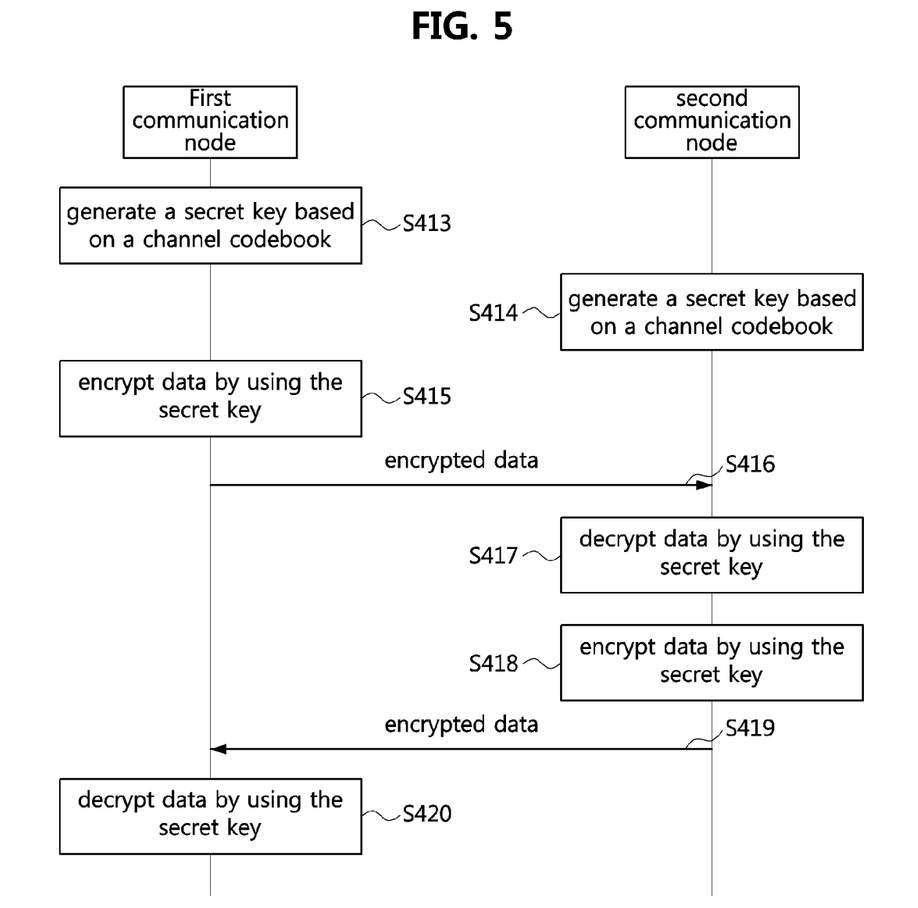
FIG. 5 is a first exemplary embodiment of a communication method using a secret key determined based on a synchronized channel codebook in a communication system.

FIG. 4 is a sequence chart illustrating a first exemplary embodiment of a method for synchronizing channel codebooks in a communication system, and FIG. 5 is a first exemplary embodiment of a communication method using a secret key determined based on a synchronized channel codebook in a communication system.

Referring to FIGS. 4 and 5, a communication system may include a first communication node and a second communication node. When the first communication node is a base station, the second communication node may be a terminal. Alternatively, when the first communication node is a terminal, the second communication node may be a base station. In sidelink communication, the first communication node may be a first terminal, and the second communication node may be a second terminal. Each of the first communication node and the second communication node may be configured to be the same or similar to the communication node shown in FIG. 3. For example, each of the first communication node and the second communication node may include an encryptor, a modulator, a control information generator, a payload generator, an FFT, an IFFT, a channel estimator, an equalizer, a demodulator, a decryptor, a channel codebook generator, a secret key codebook generator, and the like.

Each of the first communication node and the second communication node may transmit at least one of a pilot signal, a SIG field, and data. Resources used for transmitting the pilot signal, SIG field, and data may be configured as follows.

Figure 6:
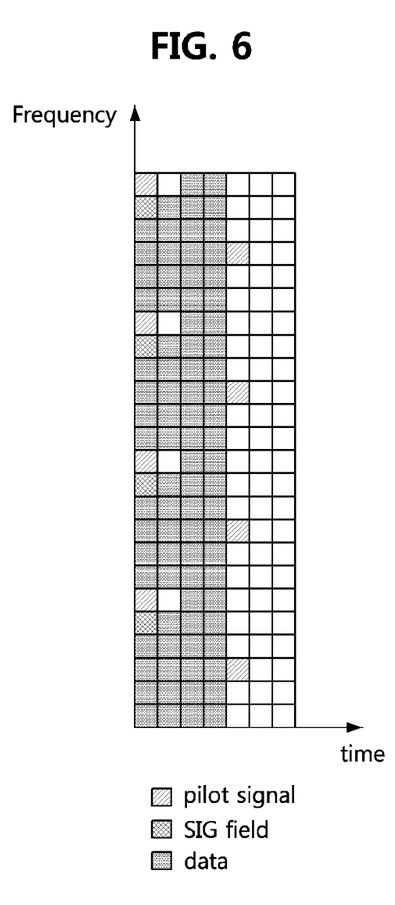
FIG. 6 is a conceptual diagram illustrating resources used by a first communication node in a communication system.

FIG. 6 is a conceptual diagram illustrating resources used by a first communication node in a communication system.

Referring to FIG. 6, one time region may include 7 symbols (e.g., symbols #0 to #6), and one frequency region may include 24 subcarriers (e.g., subcarriers #0 to #23). The first communication node may transmit data in the symbols #0 to #3. In the TDM-based communication system, the symbols #4 to #6 may be used for data transmission of the second communication node.

The first communication node may transmit a pilot signal in the symbols #0 and #4. The pilot signal may be a reference signal (e.g., channel state information-reference signal (CSI-RS), demodulation-reference signal (DM-RS), phase tracking-reference signal (PT-RS), or the like). The pilot signal may be mapped to resources at a regular interval (e.g., 5 subcarriers) in the frequency axis.

The first communication node may transmit a SIG field in the symbol #0. The SIG field may include control information, system information, and the like. The SIG field may be mapped to resources at a regular interval (e.g., 5 subcarriers) in the frequency axis.

Figure 7:
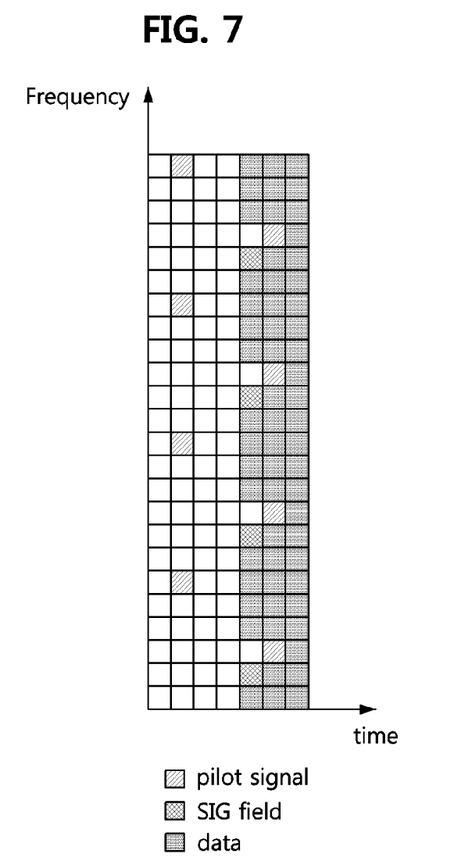
FIG. 7 is a conceptual diagram illustrating resources used by a second communication node in a communication system.

FIG. 7 is a conceptual diagram illustrating resources used by a second communication node in a communication system.

Referring to FIG. 7, one time region may include 7 symbols (e.g., symbols #0 to #6), and one frequency region may include 24 subcarriers (e.g., subcarriers #0 to #23). The second communication node may transmit data in the symbols #4 to #6. In the TDM-based communication system, the symbols #0 to #3 may be used for data transmission of the first communication node.

The second communication node may transmit a pilot signal in the symbols #1 and #5. The pilot signal may be a reference signal (e.g., CSI-RS, DM-RS, PT-RS, etc.). The pilot signal may be mapped to resources at a regular interval (e.g., 5 subcarriers) in the frequency axis. The second communication node may transmit a SIG field in the symbol #4. The SIG field may include control information, system information, and the like. The SIG field may be mapped to resources at a regular interval (e.g., 5 subcarriers) in the frequency axis.

Referring back to FIGS. 4 and 5, the first communication node may transmit the pilot signal to the second communication node (S401). The pilot signal may be transmitted through the resources shown in FIG. 6, and may be transmitted according to a preconfigured periodicity. The pilot signal may be used to estimate the channel state between the first communication node and the second communication node.

The second communication node may receive the pilot signal from the first communication node, and estimate the channel between the first communication node and the second communication node based on the pilot signal (S402). The second communication node may determine a channel codebook (hereinafter referred to as 'second channel codebook') based on the estimated channel state information (S403). In the step S403, the length of the index of the second channel codebook may be determined. The step S403 may be performed by the channel codebook generator shown in FIG. 3. For example, the second communication node may determine the length B of the index of the second channel codebook using Equations 1 to 4 described above.

On the other hand, the second communication node may transmit the pilot signal to the first communication node (S404). The pilot signal may be transmitted through the resources shown in FIG. 7, and may be transmitted according to a preconfigured periodicity. The pilot signal may be used to estimate the channel state between the first communication node and the second communication node. The step S404 may be performed before the step S402 or the step S403.

The first communication node may receive the pilot signal from the second communication node, and estimate the channel between the first communication node and the second communication node based on the pilot signal (S405). The first communication node may determine a channel codebook (hereinafter, referred to as 'first channel codebook') based on the estimated channel state information (S406). In the step S406, the length of the index of the first channel codebook may be determined. The step S406 may be performed by the channel codebook generator shown in FIG. 3. For example, the first communication node may determine the length B of the index of the first channel codebook using Equations 1 to 4 described above.

The first communication node may transmit a SIG field including information of the first channel codebook (e.g., the length of the index of the first channel codebook) determined in the step S406 to the second communication node (S407). The SIG field may be transmitted through the resources shown in FIG. 6.

The second communication node may obtain the information of the first channel codebook by receiving the SIG field from the first communication node. The second communication node may compare the size of the first channel codebook (e.g., the length of the index of the first channel codebook) and the size of the second channel codebook (e.g., the length of the index of the second channel codebook) (S408). When the size of the first channel codebook is less than or equal to the size of the second channel codebook, the second communication node may synchronize the size of the second channel codebook to the size of the first channel codebook. That is, the second communication node may adjust the size of the second channel codebook to be the same as the size of the first channel codebook.

When the synchronization between the first channel codebook and the second channel codebook is completed, the second communication node may transmit to the first communication node an ACK indicating that synchronization between the first channel codebook and the second channel codebook is completed (S409). The ACK may indicate that the first channel codebook proposed by the first communication node can be used for communication between the first communication node and the second communication node. When the ACK is received from the second communication node, the first communication node may determine that the first channel codebook can be used for communication between the first communication node and the second communication node. In this case, the steps S410 to S412 may not be performed.

On the other hand, when the size of the first channel codebook exceeds the size of the second channel codebook, the second communication node may not synchronize the size of the second channel codebook to the size of the first channel codebook. In this case, the second communication node may transmit to the first communication node a NACK indicating that synchronization between the first channel codebook and the second channel codebook is not completed (S409). The NACK may indicate that the first channel codebook proposed by the first communication node cannot be used for communication between the first communication node and the second communication node. When the NACK is received from the second communication node, the first communication node may determine that the first channel codebook cannot be used for communication between the first communication node and the second communication node.

After transmitting the NACK, the second communication node may transmit a SIG field including information of the second channel codebook (e.g., the length of the index of the second channel codebook) to the first communication node (S410). The SIG field may be transmitted through the resources shown in FIG. 7.

The first communication node may obtain the information of the second channel codebook by receiving the SIG field from the second communication node. The first communication node may compare the size of the second channel codebook (e.g., the length of the index of the second channel codebook) and the size of the first channel codebook (e.g., the length of the index of the first channel codebook) (S411). When the size of the second channel codebook is less than or equal to the size of the first channel codebook, the first communication node may synchronize the size of the first channel codebook to the size of the second channel codebook. That is, the first communication node may adjust the size of the first channel codebook to be the same as the size of the second channel codebook.

When synchronization between the first channel codebook and the second channel codebook is completed, the first communication node may transmit to the second communication node an ACK indicating that synchronization between the first channel codebook and the second channel codebook is completed (S412). The ACK may indicate that the second channel codebook proposed by the second communication node can be used for communication between the first communication node and the second communication node. When the ACK is received from the first communication node, the second communication node may determine that the second channel codebook can be used for communication between the first communication node and the second communication node.

The operations shown in FIG. 4 may be performed when a periodic or specific event occurs. For example, when the channel state estimated based on the pilot signal is changed (e.g., when the current channel state is different from the previous channel state), each of the first communication node and the second communication node may regenerate the channel codebook, and the synchronization procedure for the regenerated channel codebooks may be performed.

When synchronization of the channel codebooks between the first communication node and the second communication node is completed, the first communication node may generate a secret key based on the synchronized channel codebook (S413). The step S413 may be performed by the secret key codebook generator shown in FIG. 3. For example, the first communication node may determine the length D of the index of the secret key codebook using Equation 5 described above, and may use an index having a length of min(B,D) bits as the secret key.

Also, the second communication node may generate a secret key based on the synchronized channel codebook (S414). The step S414 may be performed by the secret key codebook generator shown in FIG. 3. For example, the second communication node may determine the length D of the index of the secret key codebook using Equation 5 described above, and may use an index having a length of min(B,D) bits as the secret key.

The first communication node may encrypt data by using the secret key (S415). For example, the secret key codebook generator shown in FIG. 3 may provide the secret key to the encryptor, and the encryptor may encrypt the data by using the secret key. The first communication node may transmit the encrypted data to the second communication node (S416). That is, the encrypted data may be transmitted through the modulator, the payload generator, the IFFT, the antenna, and the like. The encrypted data may be transmitted through the resources shown in FIG. 6.

The second communication node may receive the encrypted data from the first communication node, and may perform a decryption operation on the encrypted data by using the secret key (S417). For example, the secret key codebook generator shown in FIG. 3 may provide the secret key to the decryptor, and the decryptor may perform a decryption operation on the data by using the secret key.

On the other hand, the second communication node may encrypt data by using the secret key (S418). For example, the secret key codebook generator shown in FIG. 3 may provide the secret key to the encryptor, and the encryptor may encrypt the data by using the secret key. The second communication node may transmit the encrypted data to the first communication node (S419). That is, the encrypted data may be transmitted through the modulator, the payload generator, the IFFT, the antenna, and the like. The encrypted data may be transmitted through the resources shown in FIG. 7.

The first communication node may receive the encrypted data from the second communication node, and may perform a decryption operation on the encrypted data by using the secret key (S420). For example, the secret key codebook generator shown in FIG. 3 may provide the secret key to the decryptor, and the decryptor may perform a decryption operation on the data by using the secret key.

In the full-duplex based communication system, the steps S416 and S419 may be performed simultaneously. In this case, the secret key may be used for the decryption operation of the data received after a certain delay, a predefined time, or counting data units from the execution of the step S416.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. An operation method of a first communication node in a communication system, the operation method comprising:
   estimating a channel state between the first communication node and a second communication node based on a pilot signal received from the second communication node;
   generating a first channel codebook based on the estimated channel state;
   transmitting information of the first channel codebook to the second communication node;
   receiving a response indicating whether the first channel codebook is to be used from the second communication node;
   when the response is an acknowledgment (ACK) indicating that the first channel codebook is to be used, generating a first secret key by using the first channel codebook; and
   transmitting data encrypted using the first secret key to the second communication node,
   wherein, when a size of the first channel codebook is equal to or less than a size of a second channel codebook generated by the second communication node, the ACK is received from the second communication node, and the second channel codebook is generated based on a pilot signal transmitted from the first communication node.

2. The operation method according to claim 1, wherein the first channel codebook is selected within a set of channel codebooks predefined between the first communication node and the second communication node, and the first channel codebook is a vector quantization set for the estimated channel state.

3. The operation method according to claim 1, wherein the first channel codebook is generated when the estimated channel state is different from a previously estimated channel state.

4. The operation method according to claim 1, wherein information of the estimated channel state includes channel variance information and a signal to interference plus noise ratio (SINR).

5. The operation method according to claim 1, further comprising:
   receiving data from the second communication node; and
   performing a decryption operation on the data by using the first secret key.

6. The operation method according to claim 1, further comprising, when the response is a negative ACK (NACK) indicating that the first channel codebook is not to be used,
   receiving information of a second channel codebook from the second communication node;
   generating a second secret key by using the second channel codebook; and
   transmitting data encrypted using the second secret key to the second communication node,
   wherein the second channel codebook is generated based on a pilot signal transmitted from the first communication node.

7. The operation method according to claim 6, wherein, when a size of the first channel codebook exceeds a size of the second channel codebook, the NACK is received from the second communication node.

8. A first communication node in a communication system, the first communication node comprising:
   a channel estimator estimating a channel state between the first communication node and a second communication node based on a pilot signal received from the second communication node;
   a channel codebook generator generating a first channel codebook based on the estimated channel state;
   a secret key codebook generator generating a secret key based on the first channel codebook;
   an encryptor performing an encryption operation on transmission data by using the secret key; and
   a decryptor performing a decryption operation on reception data by using the secret key,
   wherein, when a size of the first channel codebook is equal to or less than a size of a second channel codebook generated by the second communication node, the secret key is generated by using the first channel codebook, and the second channel codebook is generated based on a pilot signal transmitted from the first communication node.

9. The first communication node according to claim 8, wherein information of the estimated channel state includes channel variance information and a signal to interference plus noise ratio (SINR).

10. The first communication node according to claim 8, wherein the first channel codebook is selected within a set of channel codebooks predefined between the first communication node and the second communication node, and the first channel codebook is a vector quantization set for the estimated channel state.

11. The first communication node according to claim 8, wherein the first channel codebook is generated when the estimated channel state is different from a previously estimated channel state.

12. The first communication node according to claim 8, wherein, when a size of the first channel codebook exceeds a size of a second channel codebook generated by the second communication node, the secret key is generated by using the first channel codebook the size of which is adjusted to be equal to the size of the second channel codebook, and the second channel codebook is generated based on a pilot signal transmitted from the first communication node.

13. The first communication node according to claim 8, wherein, when the first communication node supports a full duplex communication, the secret key used for the encryption operation is used in the decryptor after a preconfigured time.

* * * * *